(12) United States Patent
Kaufman et al.

(10) Patent No.: US 10,683,760 B2
(45) Date of Patent: Jun. 16, 2020

(54) GAS TURBINE ENGINE COMPONENT PLATFORM COOLING

(71) Applicant: UNITED TECHNOLOGIES CORPORATION, Hartford, CT (US)

(72) Inventors: Eleanor D. Kaufman, Cromwell, CT (US); Matthew A. Devore, Rocky Hill, CT (US)

(73) Assignee: United Technologies Corporation, Farmington, CT (US)

( * ) Notice: Subject to any disclaimer, the term of this patent is extended or adjusted under 35 U.S.C. 154(b) by 549 days.

(21) Appl. No.: 14/713,186

(22) Filed: May 15, 2015

(65) Prior Publication Data
US 2016/0376895 A1 Dec. 29, 2016

Related U.S. Application Data

(62) Division of application No. 13/653,633, filed on Oct. 17, 2012, now abandoned.

(51) Int. Cl.
| | |
|---|---|
| *F01D 5/14* | (2006.01) |
| *F01D 25/12* | (2006.01) |
| *F02C 7/18* | (2006.01) |
| *F01D 5/18* | (2006.01) |
| *F01D 9/04* | (2006.01) |

(52) U.S. Cl.
CPC .............. *F01D 5/145* (2013.01); *F01D 5/187* (2013.01); *F01D 9/041* (2013.01); *F01D 25/12* (2013.01); *F02C 7/18* (2013.01); *F05D 2220/32* (2013.01); *F05D 2240/81* (2013.01);
(Continued)

(58) Field of Classification Search
CPC . F01D 5/145; F01D 25/12; F02C 7/18; F05D 2240/81; F05D 2260/23; F05D 2260/2212; F05D 2260/2214; F05D 2260/22141
See application file for complete search history.

(56) References Cited

U.S. PATENT DOCUMENTS

| | | | |
|---|---|---|---|
| 3,800,864 A | 4/1974 | Hauser et al. | |
| 5,197,852 A | 3/1993 | Walker et al. | |

(Continued)

FOREIGN PATENT DOCUMENTS

| | | |
|---|---|---|
| EP | 1319804 A1 | 6/2003 |
| EP | 2211024 A | 7/2010 |

(Continued)

OTHER PUBLICATIONS

International Preliminary Report on Patentability for PCT Application No. PCT/US2013/064490, dated Apr. 30, 2015.
(Continued)

*Primary Examiner* — Todd E Manahan
*Assistant Examiner* — Kyle Robert Thomas
(74) *Attorney, Agent, or Firm* — Carlson, Gaskey & Olds, P.C.

(57) ABSTRACT

A component for a gas turbine engine according to an exemplary aspect of the present disclosure includes, among other things, a platform having an outer surface and an inner surface that axially extend between a leading edge portion and a trailing edge portion. At least one augmentation feature is disposed on at least the leading edge portion or the trailing edge portion of the outer surface of the platform.

20 Claims, 6 Drawing Sheets

(52) U.S. Cl.
CPC ............. *F05D 2260/2212* (2013.01); *F05D 2260/2214* (2013.01); *F05D 2260/22141* (2013.01)

(56) References Cited

U.S. PATENT DOCUMENTS

| | | | |
|---|---|---|---|
| 5,252,026 A | 10/1993 | Shepherd | |
| 5,353,865 A | 10/1994 | Adiutori et al. | |
| 5,413,458 A | 5/1995 | Calderbank | |
| 6,830,427 B2* | 12/2004 | Lafarge | F01D 5/288 415/115 |
| 6,832,893 B2* | 12/2004 | Chevrefils | F01D 5/081 416/193 A |
| 8,016,546 B2 | 9/2011 | Surace et al. | |
| 8,459,935 B1* | 6/2013 | Liang | F01D 5/187 415/115 |
| 2004/0009059 A1 | 1/2004 | Soechting et al. | |
| 2005/0217277 A1 | 10/2005 | Alvanos et al. | |
| 2006/0042255 A1* | 3/2006 | Bunker | F01D 25/12 60/752 |
| 2009/0280011 A1 | 11/2009 | Tibbott | |
| 2010/0221121 A1* | 9/2010 | Liang | F01D 5/187 416/97 R |
| 2010/0239432 A1* | 9/2010 | Liang | F01D 11/001 416/97 R |
| 2011/0070082 A1 | 3/2011 | Surace et al. | |
| 2012/0039708 A1* | 2/2012 | Mugglestone | F01D 9/041 415/178 |

FOREIGN PATENT DOCUMENTS

| | | |
|---|---|---|
| GB | 1322802 | 7/1973 |
| GB | 2446149 A | 8/2008 |

OTHER PUBLICATIONS

Extended European Search Report for Application No. EP 13 86 7802 dated Jun. 29, 2016.

International Search Report and Written Opinion of the International Searching Authority for International application No. PCT/US2013/064490 dated Jun. 26, 2014.

International Preliminary Report on Patentability for International application No. PCT/US2013/064490 dated Apr. 30, 2015.

* cited by examiner

GAS TURBINE ENGINE COMPONENT PLATFORM COOLING

CROSS-REFERENCE TO RELATED APPLICATION

This is a divisional application of U.S. patent application Ser. No. 13/653,633, which was filed Oct. 17, 2012.

This invention was made with government support under Contract No. F33615-03-D-2354-0017 awarded by the United States Air Force and Contract No. N00421-99-C-1270-0011 awarded by the United States Navy.

BACKGROUND

This disclosure relates generally to a gas turbine engine, and more particularly to a component that can be incorporated into a gas turbine engine. The component can include platform cooling augmentation features for cooling the platform of the component.

Gas turbine engines typically include a compressor section, a combustor section and a turbine section. During operation, air is pressurized in the compressor section and is mixed with fuel and burned in the combustor section to generate hot combustion gases. The hot combustion gases are communicated through the turbine section, which extracts energy from the hot combustion gases to power the compressor section and other gas turbine engine loads.

Both the compressor and turbine sections of the gas turbine engine may include alternating rows of rotating blades and stationary vanes that extend into the core flow path of the gas turbine engine. For example, in the turbine section, turbine blades rotate to extract energy from the hot combustion gases that are communicated along the core flow path of the gas turbine engine. The turbine vanes prepare the airflow for the next set of blades.

Blades and vanes are examples of components that may need cooled in order to withstand the relatively high temperature of the hot combustion gases that are communicated along the core flow path. Typically, cooling is achieved by communicating a dedicated cooling airflow to select portions of the components.

SUMMARY

A component for a gas turbine engine according to an exemplary aspect of the present disclosure includes, among other things, a platform having an outer surface and an inner surface that axially extend between a leading edge portion and a trailing edge portion. At least one augmentation feature is disposed on at least the leading edge portion of the outer surface of the platform.

In a further non-limiting embodiment of the foregoing component, the platform is an inner diameter platform.

In a further non-limiting embodiment of either of the foregoing components, the component is a turbine vane.

In a further non-limiting embodiment of any of the foregoing components, the outer surface is a non-gas path side of the platform and the inner surface is a gas path side of the platform.

In a further non-limiting embodiment of any of the foregoing components, an airfoil extends from the inner surface of the platform.

In a further non-limiting embodiment of any of the foregoing components, the at least one augmentation feature includes a plurality of trip strips.

In a further non-limiting embodiment of any of the foregoing components, each of the plurality of trip strips are angled relative to opposing mate faces of the platform.

In a further non-limiting embodiment of any of the foregoing components, each of the plurality of trip strips include a first portion and a second portion that is transverse to the first portion.

In a further non-limiting embodiment of any of the foregoing components, the first portions are angled at a first angle relative to a mate face of the platform and the second portions are angled at a second angle different from the first angle relative to the mate face.

In a further non-limiting embodiment of any of the foregoing components, the at least one augmentation feature is disposed on a portion of the outer surface of the platform that axially overlaps a neighboring component of the gas turbine engine.

In a further non-limiting embodiment of any of the foregoing components, a second platform includes at least one augmentation feature disposed on at least one of a leading edge portion and a trailing edge portion of an outer surface of the second platform.

In a further non-limiting embodiment of any of the foregoing components, the at least one augmentation feature includes pin fins.

In a further non-limiting embodiment of any of the foregoing components, the at least one augmentation feature includes chevron trip strips.

In a further non-limiting embodiment of any of the foregoing components, the at least one augmentation feature includes a combination of trip strips, pin fins and chevron trip strips.

A component for a gas turbine engine according to another exemplary aspect of the present disclosure includes, among other things, a platform having an outer surface located on a non-gas path side of the platform and an inner surface located on a gas path side of the platform, the outer surface and the inner surface axially extending between a leading edge portion and a trailing edge portion of the platform. A plurality of augmentation features are disposed on each of the leading edge portion and the trailing edge portion of the outer surface of the platform.

In a further non-limiting embodiment of the foregoing component, the plurality of augmentation features include trip strips.

In a further non-limiting embodiment of either of the foregoing components, a second platform includes another plurality of augmentation features disposed on at least one of a leading edge portion and a trailing edge portion of a non-gas path surface of the second platform.

A component for a gas turbine engine according to another exemplary aspect of the present disclosure includes, among other things, a platform having an outer surface and an inner surface that axially extend between a leading edge portion and a trailing edge portion. A first augmentation feature is disposed on at least one of the leading edge portion and the trailing edge portion of the outer surface of the platform, the first augmentation feature including a first portion and a second portion that is transverse to the first portion.

In a further non-limiting embodiment of the foregoing component, the first portion is angled at a first angle relative to a mate face of the platform and the second portion is angled at a second angle different from the first angle relative to the mate face.

In a further non-limiting embodiment of either of the foregoing components, a second augmentation feature is disposed adjacent to the first augmentation feature, the second augmentation feature including a third portion and a fourth portion transverse to the third portion, the third portion extending parallel to the first portion and the fourth portion extending parallel to the second portion.

The various features and advantages of this disclosure will become apparent to those skilled in the art from the following detailed description. The drawings that accompany the detailed description can be briefly described as follows.

DETAILED DESCRIPTION

Figure 1:
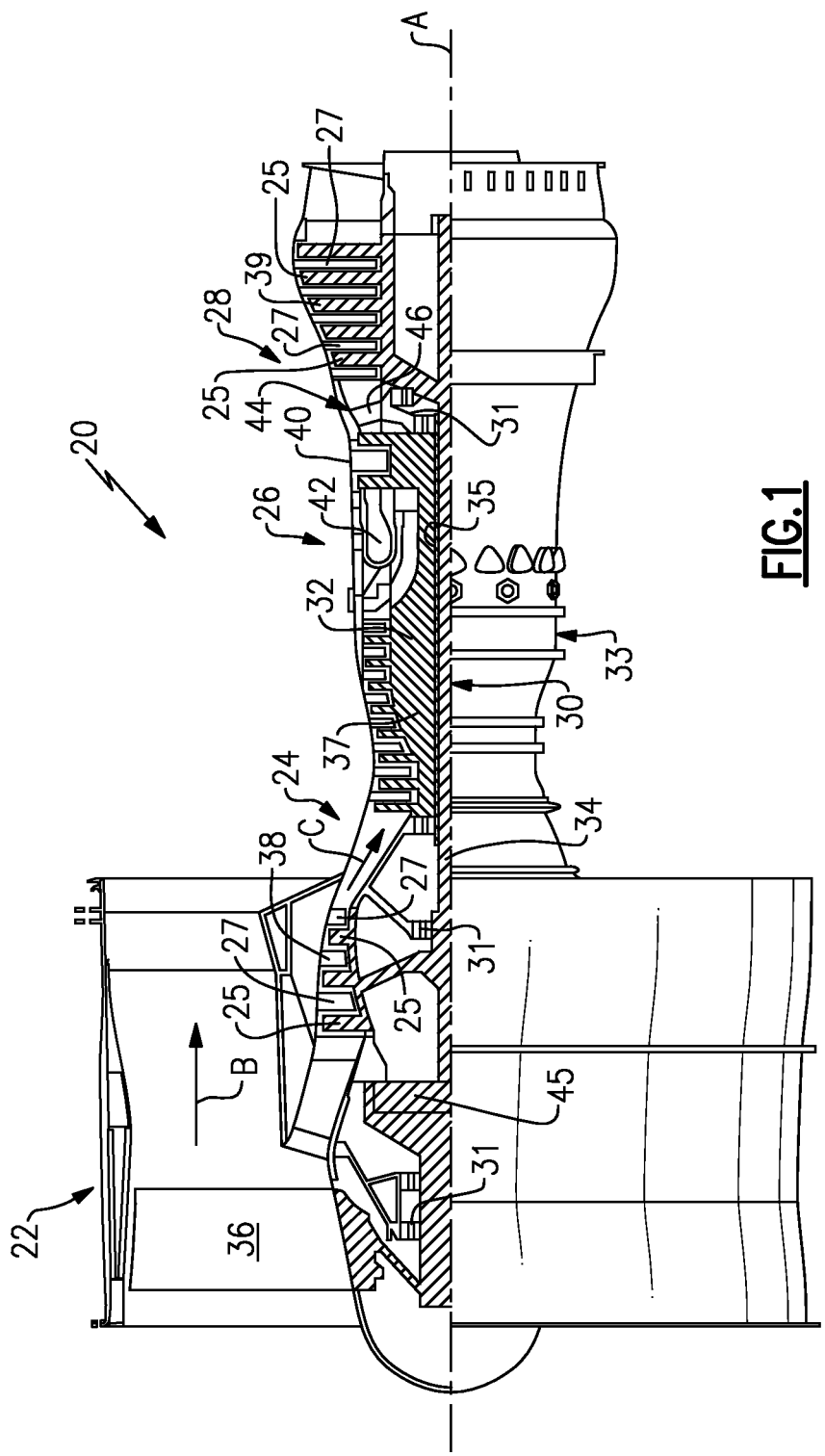
FIG. 1 illustrates a schematic, cross-sectional view of a gas turbine engine.

FIG. 1 schematically illustrates a gas turbine engine 20. The exemplary gas turbine engine 20 is a two-spool turbofan engine that generally incorporates a fan section 22, a compressor section 24, a combustor section 26 and a turbine section 28. Alternative engines might include an augmenter section (not shown) among other systems for features. The fan section 22 drives air along a bypass flow path B, while the compressor section 24 drives air along a core flow path C for compression and communication into the combustor section 26. The hot combustion gases generated in the combustor section 26 are expanded through the turbine section 28. Although depicted as a turbofan gas turbine engine in the disclosed non-limiting embodiment, it should be understood that the concepts described herein are not limited to turbofan engines and these teachings could extend to other types of engines, including but not limited to, three-spool engine architectures.

The gas turbine engine 20 generally includes a low speed spool 30 and a high speed spool 32 mounted for rotation about an engine centerline longitudinal axis A. The low speed spool 30 and the high speed spool 32 may be mounted relative to an engine static structure 33 via several bearing systems 31. It should be understood that other bearing systems 31 may alternatively or additionally be provided.

The low speed spool 30 generally includes an inner shaft 34 that interconnects a fan 36, a low pressure compressor 38 and a low pressure turbine 39. The inner shaft 34 can be connected to the fan 36 through a geared architecture 45 to drive the fan 36 at a lower speed than the low speed spool 30. The high speed spool 32 includes an outer shaft 35 that interconnects a high pressure compressor 37 and a high pressure turbine 40. In this embodiment, the inner shaft 34 and the outer shaft 35 are supported at various axial locations by bearing systems 31 positioned within the engine static structure 33.

A combustor 42 is arranged between the high pressure compressor 37 and the high pressure turbine 40. A mid-turbine frame 44 may be arranged generally between the high pressure turbine 40 and the low pressure turbine 39. The mid-turbine frame 44 can support one or more bearing systems 31 of the turbine section 28. The mid-turbine frame 44 may include one or more airfoils 46 that extend within the core flow path C.

The inner shaft 34 and the outer shaft 35 are concentric and rotate via the bearing systems 31 about the engine centerline longitudinal axis A, which is co-linear with their longitudinal axes. The core airflow is compressed by the low pressure compressor 38 and the high pressure compressor 37, is mixed with fuel and burned in the combustor 42, and is then expanded over the high pressure turbine 40 and the low pressure turbine 39. The high pressure turbine 40 and the low pressure turbine 39 rotationally drive the respective high speed spool 32 and the low speed spool 30 in response to the expansion.

Each of the compressor section 24 and the turbine section 28 may include alternating rows of rotor assemblies and vane assemblies (shown schematically) that carry airfoils that extend into the core flow path C. For example, the rotor assemblies can carry a plurality of rotating blades 25, while each vane assembly can carry a plurality of vanes 27 that extend into the core flow path C. The blades 25 of the rotor assemblies create or extract energy (in the form of pressure) from the core airflow that is communicated through the gas turbine engine 20 along the core flow path C. The vanes 27 of the vane assemblies direct the core air flow to the blades 25 to either add or extract energy.

Various components of the gas turbine engine 20, such as the blades 25 and the vanes 27 on the compressor section 24 and/or the turbine section 28, may be subjected to repetitive thermal cycling under widely ranging temperatures and pressures. The hardware of the turbine section 28 is particularly subjected to relatively extreme operating conditions. Therefore, some components may need cooled during engine operation. Example cooling features that can be incorporated into the components to improve cooling efficiency are described below.

Figure 2:
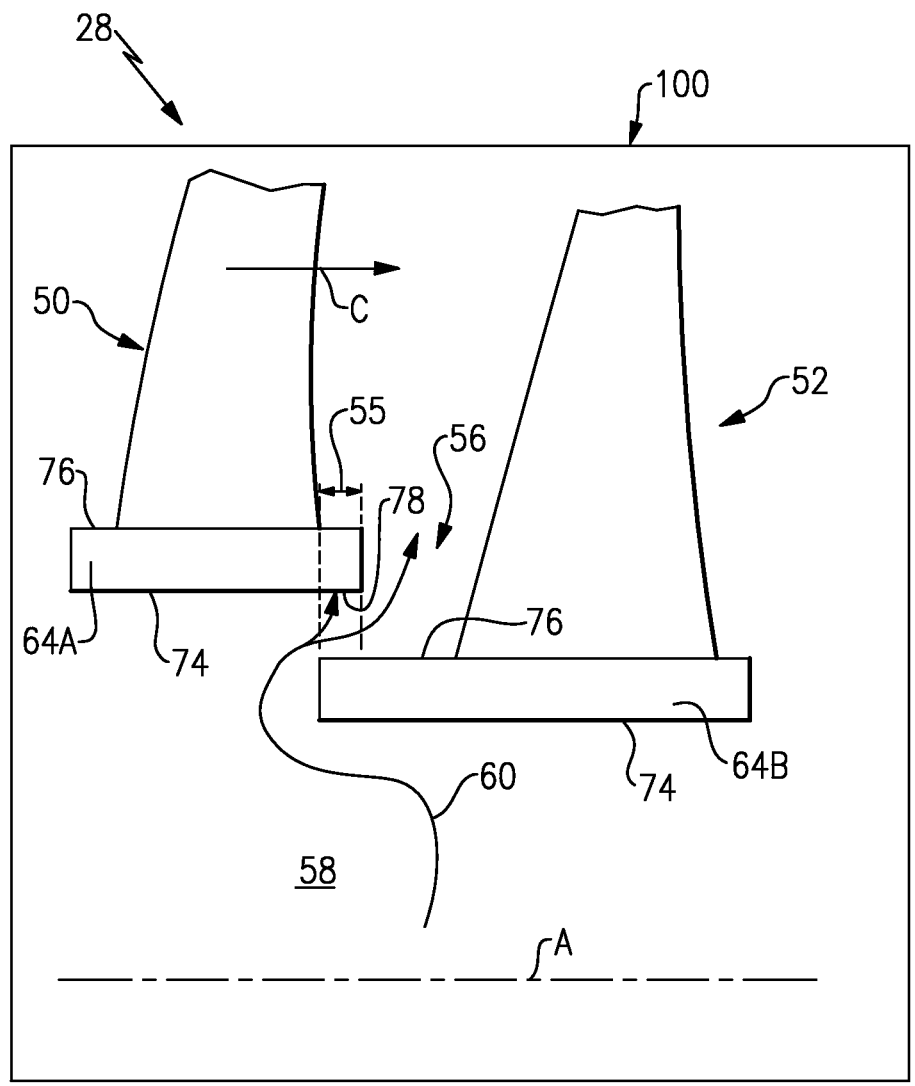
FIG. 2 illustrates a cross-section of a portion of a gas turbine engine.

FIG. 2 schematically illustrates a portion 100 of a gas turbine engine, such as the gas turbine engine 20 of FIG. 1. In this exemplary embodiment, the portion 100 represents part of the turbine section 28 of the gas turbine engine 20. However, it should be understood that other portions of the gas turbine engine 20 could benefit from the teachings of this disclosure, including but not limited to, the compressor section 24.

In this exemplary embodiment, the portion 100 includes a first component 50 and a second component 52 positioned adjacent to the first component 50. For example, the first component 50 may represent a vane (a generally static structure) and the second component 52 may represent a blade mounted for rotation about the engine centerline longitudinal axis A. Although only a single vane and a single blade are illustrated in FIG. 2, multiple vanes and blades could be circumferentially disposed about the engine centerline longitudinal axis A to provide vane and rotor assemblies. The portion 100 could also include additional, alternating rows of vanes and blades. FIG. 2 is highly schematic, and it should be understood that the various features depicted by this figure are not necessarily drawn to the scale they would be in practice.

In this embodiment, the first component 50 establishes a radially outer and radially inner flow path boundary of the core flow path C and directs the hot combustion gases communicated along the core flow path C to the second component 52. The second component 52 rotates to extract energy from the hot combustion gases that are communicated through the gas turbine engine 20.

The first component 50 and the second component 52 are mounted within the portion 100 such that a gap 56 extends between the first component 50 and the second component 52. A positive pressure can be maintained within the portion 100 by communicating a leakage airflow 60 into the gap 56. The leakage airflow 60 is communicated through a cavity 58 (positioned radially inwardly from the first component 50 and the second component 52) and then through the gap 56 to keep the hot combustion gases of the core flow path C from entering through the gap 56 and potentially damaging components. The leakage airflow 60 may be communicated from the compressor section 24 or some other upstream location of the gas turbine engine 20.

As is discussed in greater detail below, the leakage airflow 60 can also be used to cool portions of one or both of the first component 50 and the second component 52. In other words, the leakage airflow 60 that may be used to cool portions of the first component 50 and/or the second component 52 is not a dedicated cooling airflow that serves no other purpose other than to cool the component(s) 50, 52. In this disclosure, the term "dedicated cooling airflow" may refer to air which feeds the inside of the component(s) 50, 52 and the term "leakage airflow" may refer to airflow that bypasses the inside of the component(s) 50, 52, such as for purging cavities or preventing ingestion.

The first component 50 and/or the second component 52 can include cooling features that increase a local heat transfer effect of the first and/or second component 50, 52 without requiring a large flow pressure ratio. For example, in one embodiment, the first component 50 includes a platform 64A and the second component 52 includes a platform 64B. Each of the platforms 64A, 64B includes an outer surface 74 and an inner surface 76. In one embodiment, at least a portion of the second component 52 extends radially inward from, or under, the first component 50.

The platform 64A of the first component may include one or more augmentation features 78 disposed on the outer surface 74 for increasing the heat transfer effect between the platform 64A and the leakage airflow 60. The platform 64A can be cooled by circulating the leakage airflow 60 over the augmentation features 78. In one embodiment, the augmentation features 78 are disposed on a portion 55 of the platform 64A of the first component 50 that axially overlaps the platform 64B of the second component 52. The platform 64B could also include one or more augmentation features on its outer surface 74, although not shown in this embodiment.

Figure 3:
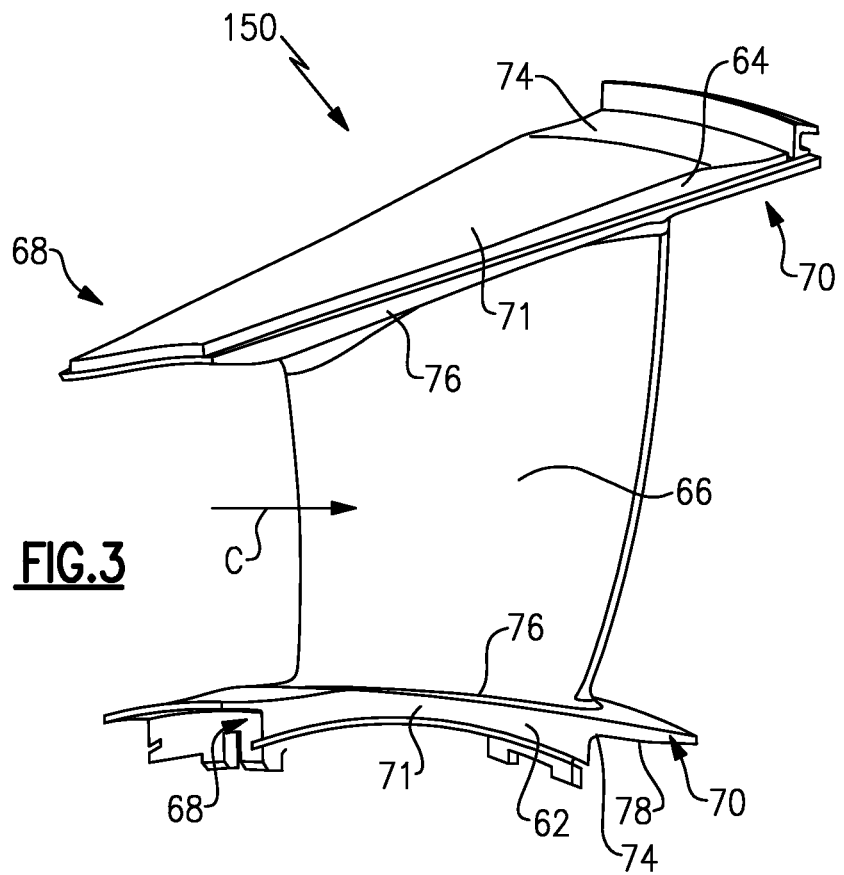
FIG. 3 illustrates a component that can be incorporated into a gas turbine engine.
Figure 4:
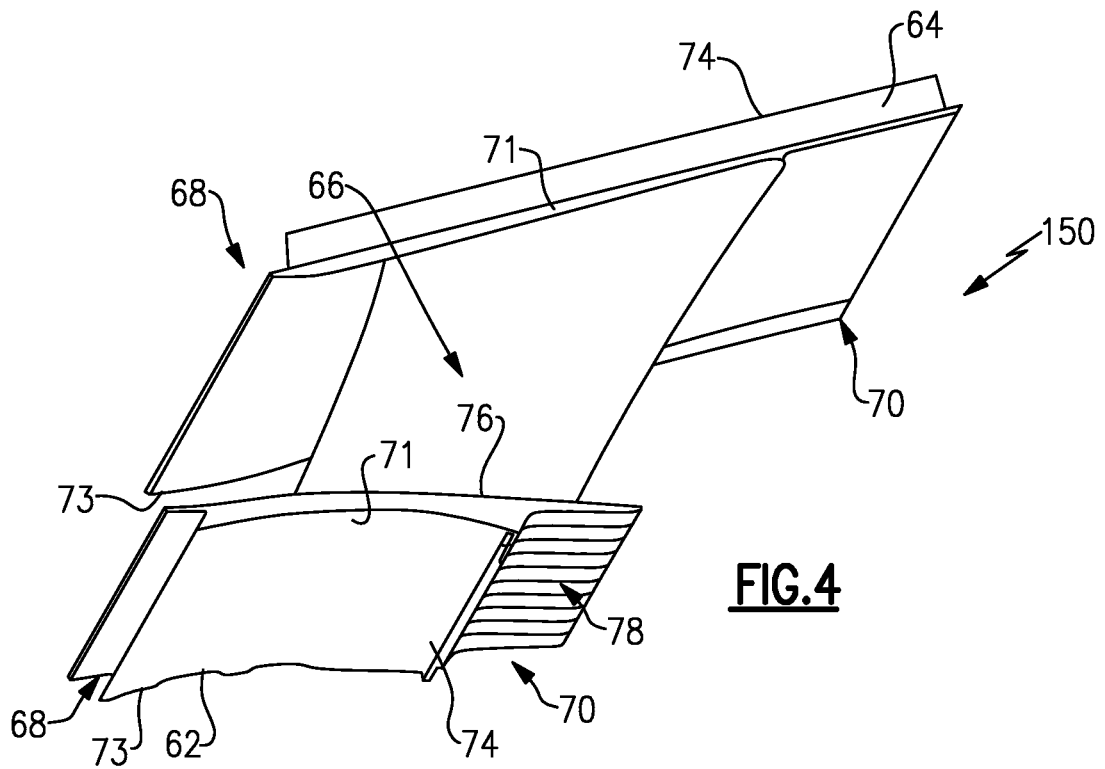
FIG. 4 illustrates another view of the component of FIG. 3.

FIGS. 3 and 4 illustrate a component 150 that can be incorporated into a gas turbine engine, such as the gas turbine engine 20 of FIG. 1. In this embodiment, the component 150 is a turbine vane similar to the first component 50 of FIG. 2. However, the various features described herein with respect to the component 150 could extend to other components of the gas turbine engine 20, including but not limited to blades (i.e., the second component 52 of FIG. 2).

The component 150 of this embodiment includes an inner diameter platform 62, an outer diameter platform 64 and an airfoil 66 that extends between the inner diameter platform 62 and the outer diameter platform 64. Each of the inner diameter platform 62 and the outer diameter platform 64 includes a leading edge portion 68, a trailing edge portion 70 and opposing mate faces 71, 73. The inner diameter and outer diameter platforms 62, 64 axially extend between the leading edge portion 68 and the trailing edge portion 70 and circumferentially extend between the opposing mate faces 71, 73. The opposing mate faces 71, 73 can be mounted relative to corresponding mate faces of adjacent components of a gas turbine engine to provide a full ring assembly, such as a full ring vane assembly that can be circumferentially disposed about the engine centerline longitudinal axis A (see FIG. 1).

The inner diameter and outer diameter platforms 62, 64 can also include an outer surface 74 (for example, a non-gas path side) and an inner surface 76 (a gas path side). In other words, when the component 150 is mounted within a gas turbine engine 20, the outer surfaces 74 are positioned on a non-core flow path side of the component 150, while the inner surfaces 76 establish the outer boundaries of the core flow path C of the gas turbine engine 20.

Figure 5:
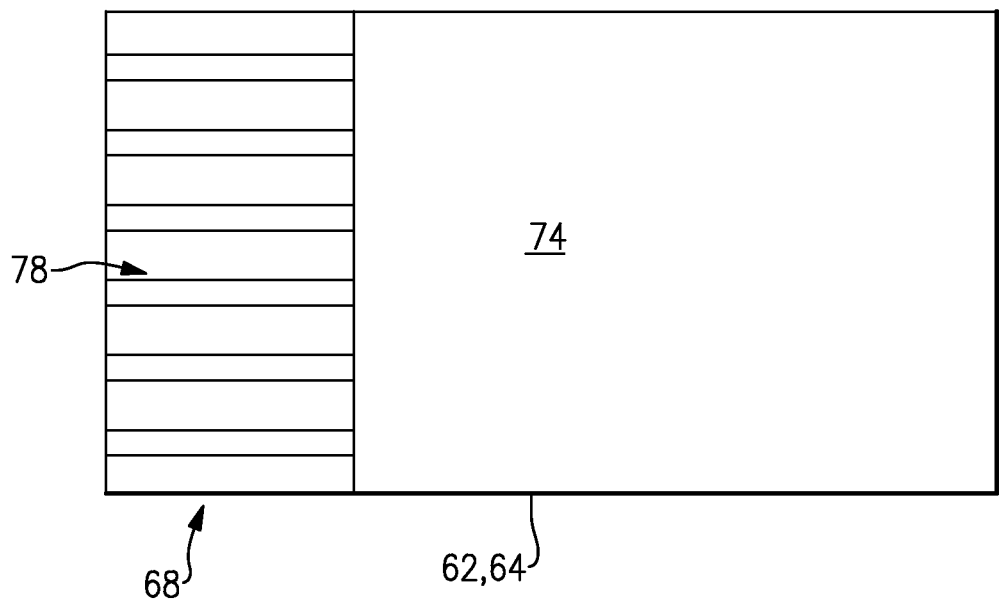
FIG. 5 illustrates a platform of a component.
Figure 6:
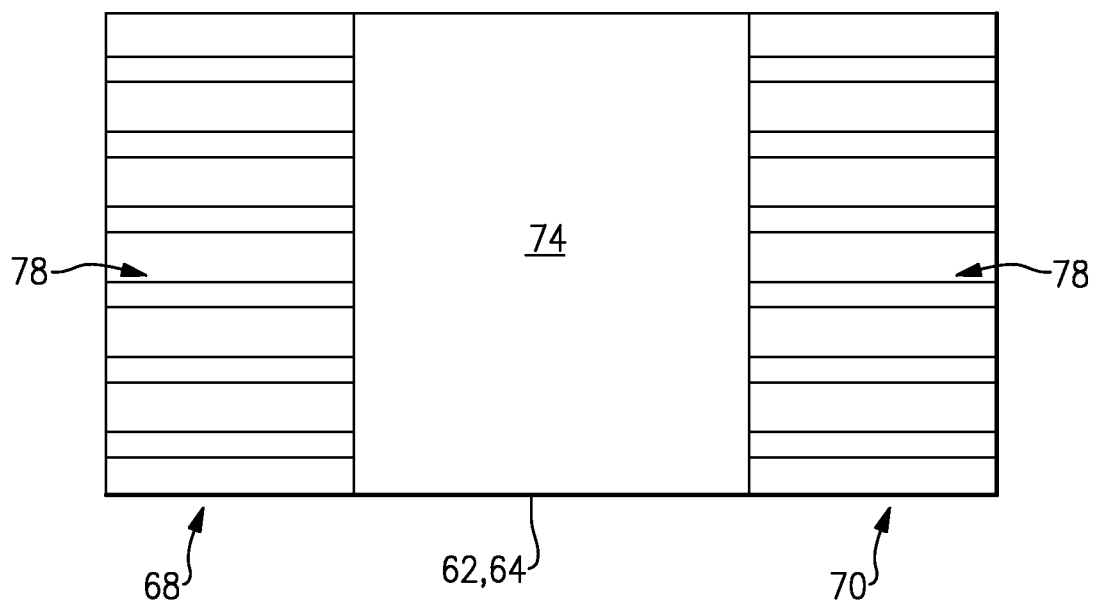
FIG. 6 illustrates another platform of a component.

One or both of the inner diameter platform 62 and the outer diameter platform 64 can include one or more augmentation features 78 disposed on the outer surfaces 74 of the inner diameter platform 62 and/or the outer diameter platform 64. In this embodiment, the augmentation features 78 are positioned at the trailing edge portion 70 of the inner diameter platform 62 (see FIG. 2 and FIG. 4). In another embodiment, the augmentation features 78 may be disposed at the leading edge portion 68 of the inner diameter platform 62 and/or the outer diameter platform 64 (see FIG. 5). In yet another embodiment, the augmentation features 78 may be formed on both the leading edge portion 68 and the trailing edge portion 70 of the inner diameter platform 62 and/or the outer diameter platform 64 (see FIG. 6). The augmentation features 78 may be disposed on any portion of the inner diameter platform 62 and/or the outer diameter platform 64, including any portion of the inner or outer diameter platforms 62, 64 that axially overlap a neighboring component (see portion 55 of FIG. 2, for example).

The exemplary augmentation features 78 can include any heat transfer augmentation features including but not limited to trip strips, pin fins, chevron trip strips, or any combination of features. In this embodiment, the augmentation features 78 include trip strips. The augmentation features 78 turbulate the flow of the leakage airflow 60 that comes into contact with the component 150 (as shown in FIG. 2) and adds surface area to platform(s) 62, 64 to enhance heat transfer between the leakage airflow 60 and the platform(s) 62, 64.

Figure 7:
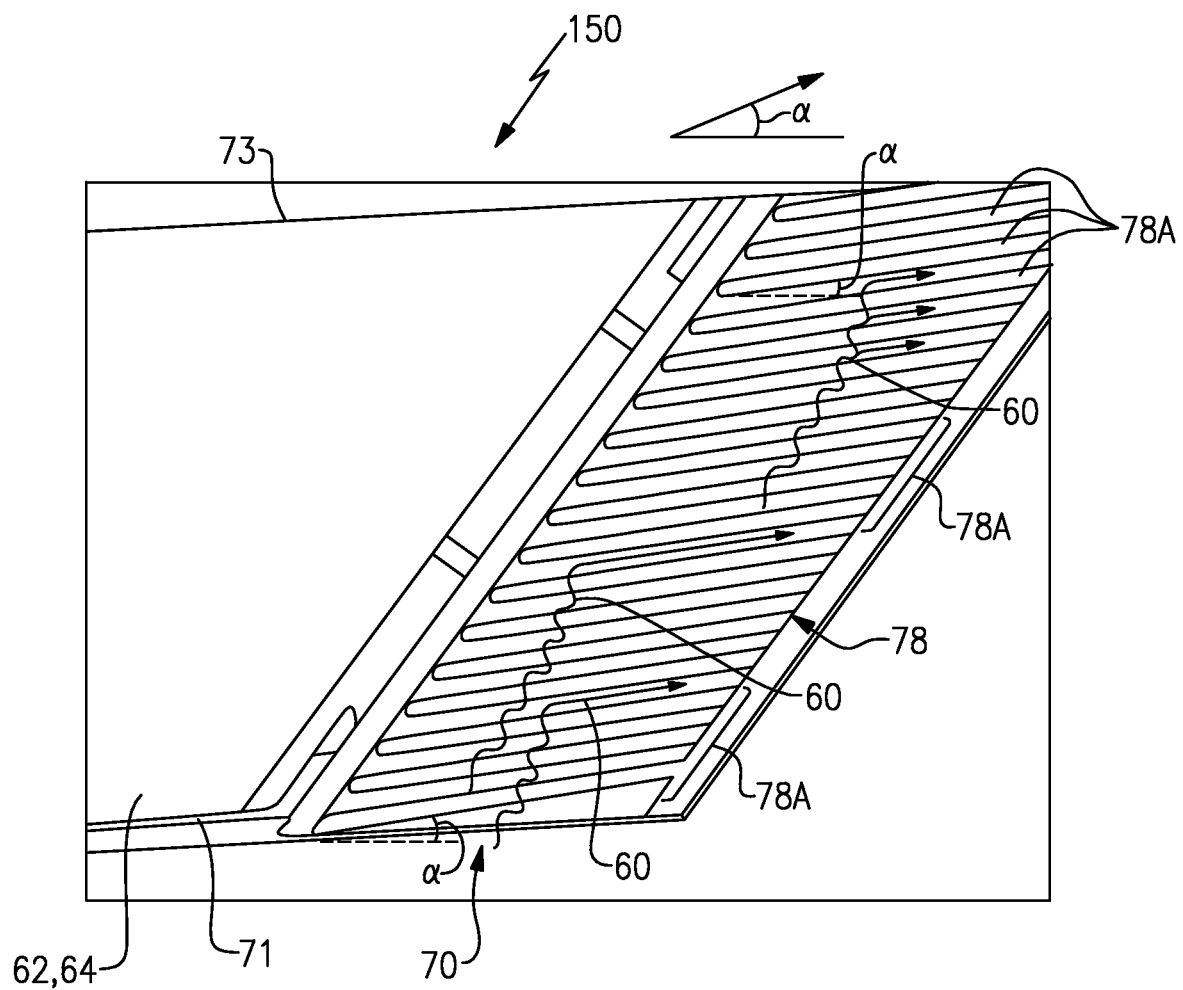
FIG. 7 illustrates augmentation features that can be incorporated into a component of a gas turbine engine.

FIG. 7 illustrates additional features of the augmentation features 78 described above. The illustrated platform 62, 64 could be representative of either an inner diameter platform or an outer diameter platform. In this embodiment, the augmentation features 78 include a plurality of trip strips 78A that are circumferentially spaced between the opposing mate faces 71, 73 at a trailing edge portion 70 of the platform 62, 64. The trip strips 78A extend parallel to one another and may each be angled at an angle α relative to the opposing mate faces 71, 73. The value of the angle α can vary depending on design specific criteria, including but not limited to the amount of heat transfer required to cool the platform 62, 64. The leakage airflow 60 may be circulated over the trip strips 78A in both a circumferential direction CD as well as an axial direction AD to cool the platform 62, 64.

Figure 8:
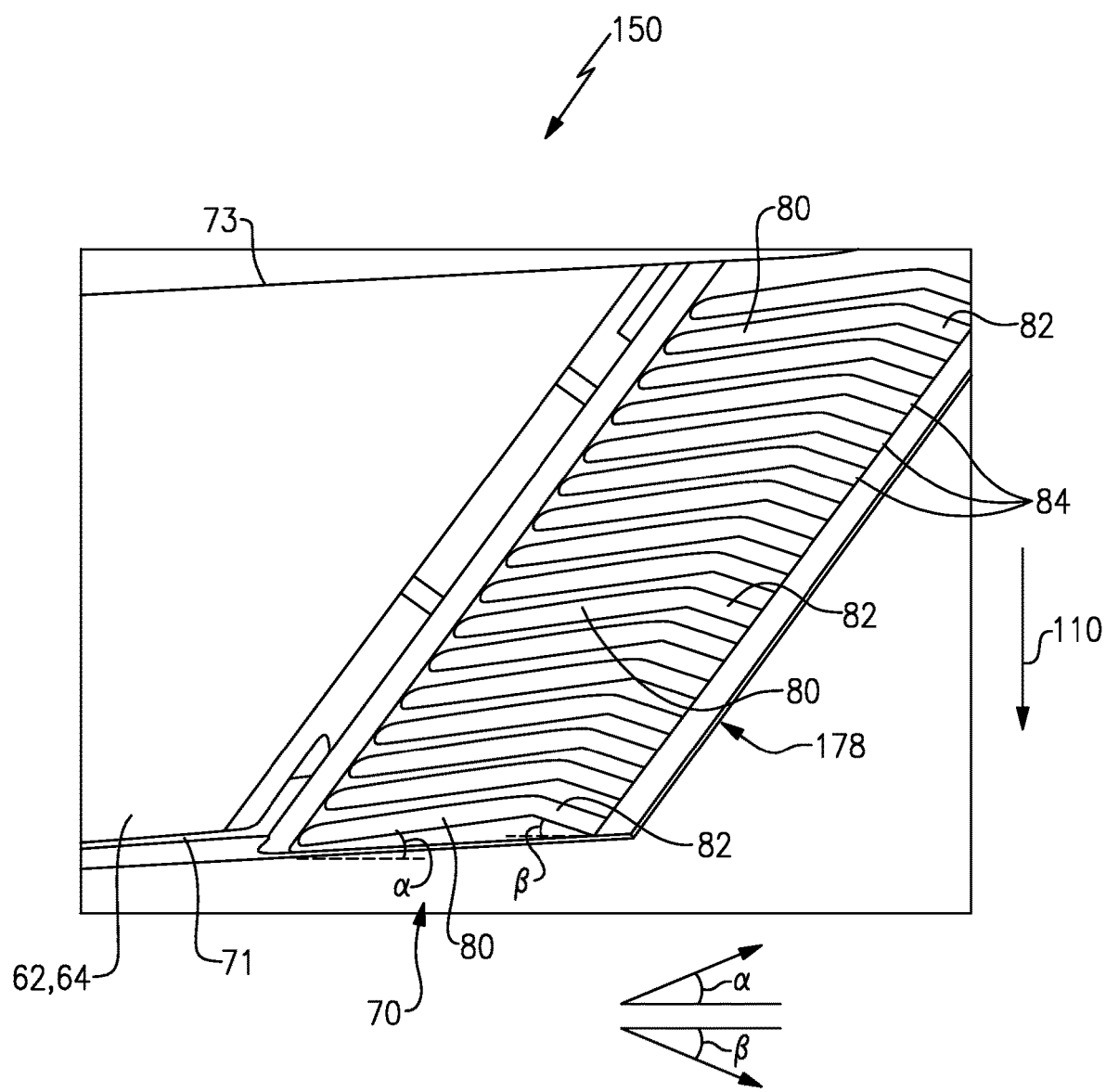
FIG. 8 illustrates additional augmentation features that can be incorporated into a component of a gas turbine engine.

FIG. 8 illustrates another plurality of augmentation features 178 that can be incorporated into a platform 62, 64 of a component 150. In this embodiment, the augmentation features 178 include a plurality of trip strips 178A that are circumferentially spaced between the opposing mate faces 71, 73 at a trailing edge portion 70 of the platform 62, 64. The plurality of trip strips 178A of this embodiment include a first portion 80 and a second portion 82 that is transverse to the first portion 80. The first portions 80 of the plurality of trip strips 178A extend parallel to one another and may each be angled at an angle α relative to the opposing mate faces 71, 73. The second portions 82 of the plurality of trip strips 178A also extend parallel to one another and may be angled at an angle β relative to the opposing mate faces 71, 73. In this embodiment, the angle β is a different angle than the angle α. The second portions 82 of the plurality of trip strips 178A direct the leakage airflow 60 into the core flow path C by directing the leakage airflow 60 circumferentially along the direction of rotation of a neighboring component (shown schematically via arrow 110), such as a blade (see the second component 52 of FIG. 2), thereby providing improved heat transfer and reducing mixing loss.

Although the different non-limiting embodiments are illustrated as having specific components, the embodiments of this disclosure are not limited to those particular combinations. It is possible to use some of the components or features from any of the non-limiting embodiments in combination with features or components from any of the non-limiting embodiments.

It should be understood that like reference numerals identify corresponding or similar elements throughout the several drawings. It should also be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would recognize that various modifications could come within the scope of this disclosure. For these reasons, the following claims should be studied to determine the true scope and content of this disclosure.

What is claimed is:

1. A component for a gas turbine engine, comprising:
   a platform having an outer surface and an inner surface that axially extend between a leading edge portion and a trailing edge portion including a trailing edge, wherein said outer surface and said inner surface are exterior surfaces of said platform; and
   a plurality of augmentation features disposed on said outer surface of said trailing edge portion, each of said plurality of augmentation features including a substantially straight first portion and a substantially straight second portion that meets said first portion at a meeting point, and each second portion is nearer said trailing edge than its respective first portion.

2. The component as recited in claim 1, wherein said platform is an inner diameter platform.

3. The component as recited in claim 1, comprising an airfoil that extends from said inner surface of said platform wherein said outer surface is a non-gas path side of said platform and said inner surface is a gas path side of said platform.

4. The component as recited in claim 1, comprising a second platform including at least one augmentation feature disposed on at least one of a leading edge portion and a trailing edge portion of an outer surface of said second platform.

5. The component as recited in claim 1, wherein said plurality of augmentation features include a series of circumferentially spaced chevron trip strips.

6. The component as recited in claim 1, wherein said platform includes opposing mate faces extending from said leading edge portion to said trailing edge portion, and each first portion angled at a first angle relative to said opposing mate faces.

7. The component as recited in claim 6, wherein each second portion is angled at a second angle relative to said opposing mate faces different from said first angle.

8. The component as recited in claim 1, wherein said platform includes opposing mate faces extending from said leading edge portion to said trailing edge portion, wherein each first portion extends toward one of said mate faces as it extends axially toward said trailing edge and toward its respective meeting point, and each second portion extends toward said other of said mating faces as it extends from its respective meeting point toward said trailing edge.

9. The component as recited in claim 8, wherein said first portions are parallel to one another.

10. The component as recited in claim 9, wherein said second portions are parallel to one another.

11. A component for a gas turbine engine, comprising:
    a platform having an outer surface and an inner surface that axially extend between a leading edge portion and a trailing edge portion including a trailing edge, said platform having opposing mate faces extending from said leading edge portion to said trailing edge portion; and
    a plurality of augmentation features disposed on said outer surface at said trailing edge portion, each of said plurality of augmentation features including a substantially straight first portion and a substantially straight second portion that meets said first portion at a meeting point, wherein each first portion extends toward one of said mate faces as it extends axially in a direction toward said trailing edge and toward its respective meeting point, and each second portion extends toward the other of said mating faces as it extends from its respective meeting point toward said trailing edge.

12. The component as recited in claim 11, wherein said first portions of said plurality of augmentation features extend parallel to one another.

13. The component as recited in claim 12, wherein said second portions of said plurality of augmentation features extend parallel to one another.

14. The component as recited in claim 13, wherein each first portion is angled at a first angle relative to said opposing mate faces, each second portion is angled at a second angle relative to said opposing mate faces, and said first angle is different from said second angle.

15. The component as recited in claim 14, wherein said second portions are angled to direct a leakage airflow into a core flow path by directing said leakage airflow circumferentially along a direction of rotation of a neighboring component.

16. The component as recited in claim 15, wherein each second portion is nearer said trailing edge than its respective first portion.

17. A gas turbine engine, comprising:
    a rotating component; and
    a static structure adjacent said rotating component, said static structure including
       a platform having an outer surface and an inner surface that axially extend between a leading edge portion and a trailing edge portion including a trailing edge, said platform having opposing mate faces extending from said leading edge portion to said trailing edge portion; and
       a plurality of augmentation features disposed on said outer surface at said trailing edge portion, each of said plurality of augmentation features including a substantially straight first portion and a substantially straight second portion that meets said first portion at a meeting point, wherein each first portion extends toward one of said mate faces as it extends axially in a direction toward said trailing edge and toward its respective meeting point, and each second portion extends toward the other of said mating faces as it extends from its respective meeting point toward said trailing edge.

18. The gas turbine engine as recited in claim 17, wherein said rotating component is configured to rotate in a rotation direction, and second portions are angled at an angle relative to said opposing mate faces to direct a leakage airflow into a core flow path by directing said leakage airflow circumferentially along the rotation direction.

19. The gas turbine engine as recited in claim 18, wherein said rotating component is a blade assembly, and said static structure is a vane assembly.

20. The gas turbine engine as recited in claim 19, wherein said plurality of augmentation features are disposed on a portion of said outer surface of said platform that axially overlaps said blade assembly.

* * * * *